United States Patent
Matsuyama et al.

(10) Patent No.: US 10,618,130 B2
(45) Date of Patent: Apr. 14, 2020

(54) METHOD FOR PRODUCING METAL MEMBER

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 100 days.

(21) Appl. No.: 15/560,311

(22) PCT Filed: Apr. 15, 2015

(86) PCT No.: PCT/JP2015/061593
§ 371 (c)(1),
(2) Date: Sep. 21, 2017

(87) PCT Pub. No.: WO2016/166843
PCT Pub. Date: Oct. 20, 2016

(65) Prior Publication Data
US 2018/0056438 A1    Mar. 1, 2018

(51) Int. Cl.
*B23K 20/12* (2006.01)
*B23K 103/20* (2006.01)
(Continued)

(52) U.S. Cl.
CPC ............ *B23K 20/129* (2013.01); *B23K 20/12* (2013.01); *B23K 20/127* (2013.01);
(Continued)

(58) Field of Classification Search
CPC .... B23K 20/12; B23K 20/129; B23K 20/127; B23K 20/126; B23K 20/125; B23K 2103/18; Y10T 29/49968
See application file for complete search history.

(56) References Cited

U.S. PATENT DOCUMENTS 3,040,427 A * 6/1962 Howell ................. B21D 39/04
228/131
3,144,710 A * 8/1964 Camps-Campins ........................
B23K 20/129
228/114.5
(Continued)

FOREIGN PATENT DOCUMENTS

CN         1334168 A    2/2002
CN       101109292 A    1/2008
(Continued)

OTHER PUBLICATIONS

Jul. 14, 2015 International Search Report issued in International Patent Application No. PCT/JP2015/061593.

*Primary Examiner* — Jermie E Cozart
(74) *Attorney, Agent, or Firm* — Oliff PLC

(57) ABSTRACT

The method includes a step of preparing a first member made of a first metal and a second member made of a second metal having a smaller deformation resistance than the first metal, and a step of joining the first member and the second member. The step of joining includes a step of heating the first member and the second member by relatively rotating the first member and the second member, while pressing the first member and the second member against each other, without changing a relative positional relationship therebetween, and a step of cooling the first member and the second member heated, while being pressed against each other. In a first contact surface which is a surface of the first member coming into contact with the second member, a recess is formed so as to include a region intersecting the axis of rotation.

11 Claims, 9 Drawing Sheets

(51) Int. Cl.
  *B23K 20/18* (2006.01)
  *B23K 103/22* (2006.01)
  *B23K 103/18* (2006.01)

(52) U.S. Cl.
  CPC .......... *B23K 20/125* (2013.01); *B23K 20/126* (2013.01); *B23K 20/18* (2013.01); *B23K 2103/20* (2018.08); *B23K 2103/22* (2018.08); *B23K 2103/26* (2018.08); *Y10T 29/49968* (2015.01)

(56) References Cited

U.S. PATENT DOCUMENTS

| | | | | |
|---|---|---|---|---|
| 3,444,611 | A | * | 5/1969 | Bogart ................ B23K 20/12 228/114.5 |
| 3,452,421 | A | * | 7/1969 | McKinley ............ B23K 20/12 228/114.5 |
| 5,897,047 | A | | 4/1999 | Takei et al. |
| 2002/0020733 | A1 | * | 2/2002 | Hirose ................ B23K 13/00 228/114.5 |
| 2003/0015570 | A1 | * | 1/2003 | Hirose ................ C22C 29/08 228/112.1 |
| 2005/0218192 | A1 | * | 10/2005 | Lovin ................ B23K 20/12 228/113 |
| 2006/0196916 | A1 | * | 9/2006 | Goldstein ............ B23K 9/08 228/114.5 |
| 2007/0272728 | A1 | | 11/2007 | Dzialas et al. |
| 2008/0016688 | A1 | | 1/2008 | Fabre et al. |
| 2015/0258642 | A1 | * | 9/2015 | Killian ................ B23P 15/14 29/893.3 |

FOREIGN PATENT DOCUMENTS

| | | |
|---|---|---|
| DE | 3626009 A1 | 2/1987 |
| DE | 69617874 T2 | 6/2002 |
| JP | S60-187486 A | 9/1985 |
| JP | H06-063775 A | 3/1994 |
| JP | H10-89241 A | 4/1998 |
| JP | 2000-301364 A | 10/2000 |
| JP | 2000-343246 A | 12/2000 |
| JP | 2002-113583 A | 4/2002 |

* cited by examiner

METHOD FOR PRODUCING METAL MEMBER

TECHNICAL FIELD

The present invention relates to methods for producing metal members, and more specifically, to a method for producing a metal member having a structure in which members made of different metals are joined.

BACKGROUND ART

A metal member having a structure in which members made of different metals are fixed to each other may be used as a machine component. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in Patent Literature 1 above, the sliding section is fixed to the base section only by engagement. If the piston shoe receives an impact, the fixed state of the sliding section to the base section may become unstable.

An object of the present invention is to provide a method for producing a metal member having a structure in which members made of different metals are directly joined to each other.

Solution to Problem

A method for producing a metal member according to the present invention includes the steps of: preparing a first member made of a first metal and a second member made of a second metal having a smaller deformation resistance than the first metal; and joining the first member and the second member. The step of joining the first member and the second member includes a step of heating the first member and the second member by relatively rotating the first member and the second member with respect to each other about an axis of rotation, while pressing the first member and the second member against each other, without changing a relative positional relationship between the first member and the second member, and a step of cooling the first member and the second member heated, with the members being pressed against each other. The first member has a surface serving as a first contact surface coming into contact with the second member in the step of heating the first member and the second member, and the first contact surface has a recess formed therein so as to include a region intersecting the axis of rotation.

In the metal member producing method of the present invention, the first member and the second member are relatively rotated with respect to each other about the axis of rotation, while being pressed against each other, without changing the relative positional relationship therebetween, so that the first member and the second member are heated. Thereafter, the first member and the second member are cooled in the state of being pressed against each other, whereby the first member and the second member are joined.

In the step of heating the first member and the second member, the circumferential velocity of the first member with respect to the second member decreases with decreasing distance from the rotational axis. The heat produced by friction between the first member and the second member decreases with decreasing distance from the rotational axis. Thus, even in the case where the temperature has been increased to a level appropriate for joining in the outer peripheral portion, the increase in temperature may be insufficient in the central portion, hindering achievement of good joining.

In the present invention, the recess is formed in the first contact surface of the first member. Thus, the heated and softened second member flows into the recess. With the heated second member entering the recess, the heat is supplied to the central portion (region including the rotational axis). This decreases the difference in temperature between the outer peripheral portion and the central portion. As a result, good joining is readily achieved over the entire joint surfaces.

As such, according to the metal member producing method of the present invention, it is possible to produce the metal member having a structure in which members made of different metals are directly joined to each other.

In the metal member producing method described above, in the step of heating the first member and the second member, the second member may be disposed in a cavity of a mold.

With this configuration, the second member in the cavity of the mold is deformed to contact the wall surfaces defining the cavity. This restricts rotation of the second member together with the first member, and also restricts further deformation. Thus, the heat generated by the friction between the first member and the second member is prevented from being released from within the cavity. As a result, the step of heating the first member and the second member can be performed efficiently.

In the metal member producing method described above, the mold may include a cavity bottom wall defining the cavity, and a cavity sidewall defining the cavity and extending in a direction intersecting the cavity bottom wall. This makes it possible to readily carry out the metal member producing method described above.

In the metal member producing method described above, in the step of heating the first member and the second member, a second contact surface, being a surface of the second member coming into contact with the first member, may be surrounded by the cavity sidewall. With this configuration, the deformation of the second member can be limited by the cavity sidewall.

In the metal member producing method described above, in the step of heating the first member and the second member, the first member may be rotated while the mold is fixed. This makes it possible to readily carry out the metal member producing method described above.

In the metal member producing method described above, the first member may have a recessed portion formed therein. The recess may be formed in the recessed portion. In the step of heating the first member and the second member, the second member in a state of being at least partially received in the recessed portion may be relatively rotated with respect to the first member while being relatively pressed against the first member, to heat the first member and the second member.

With this configuration, the second member is deformed in the recessed portion of the first member to thereby contact the wall surfaces defining the recessed portion. The deformation of the second member is limited by the wall surfaces defining the recessed portion of the first member. This prevents the heat generated by the friction between the first member and the second member from being released from within the recessed portion. As a result, the step of heating the first member and the second member can be performed efficiently.

In the metal member producing method described above, the first member may include a recessed portion bottom surface defining the recessed portion, and a recessed portion side surface defining the recessed portion and extending in a direction intersecting the recessed portion bottom surface. In the step of heating the first member and the second member, the second member may be relatively rotated while being relatively pressed against the recessed portion bottom surface of the first member. This makes it possible to readily perform the metal member producing method described above.

In the metal member producing method described above, in the step of heating the first member and the second member, the second member may be deformed to contact the recessed portion side surface. Limiting the deformation of the second member with the recessed portion side surface in this manner makes it possible to readily carry out the metal member producing method described above.

The metal member producing method described above may further include the step of, in a state where the first member and the second member are joined together, machining the first member to remove the recessed portion side surface. With this configuration, it is possible to obtain the metal member that is formed as the first member is joined at the recessed portion bottom surface to the second member.

In the metal member producing method described above, in the step of heating the first member and the second member, the second member may be rotated while the first member is fixed. This makes it possible to readily carry out the metal member producing method described above.

The metal member producing method described above may further include the step of, in a state where the first member and the second member are joined together, removing a flash formed due to deformation of the second member in the step of heating the first member and the second member. With this configuration, it is possible to obtain the metal member having removed therefrom the flash formed while joining the first member and the second member.

In the metal member producing method described above, in the step of heating the first member and the second member, the second metal in a temperature increased state may have a deformation resistance smaller by 10% or more as compared to a deformation resistance of the first metal in a temperature increased state. This facilitates joining of the first member and the second member.

Effects of the Invention

As is clear from the above description, according to the metal member producing method in the present invention, it is possible to produce the metal member having a structure in which members made of different metals are directly joined to each other.

DESCRIPTION OF EMBODIMENTS

Figure 1:
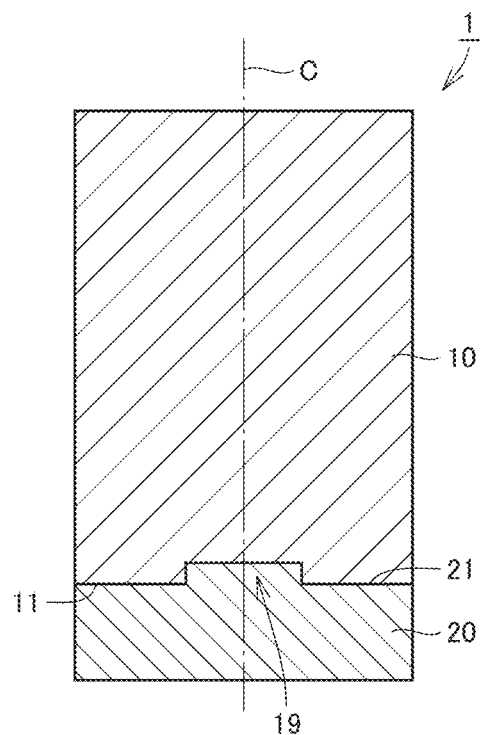
FIG. 1 is a schematic cross-sectional view showing the structure of a metal member according to a first embodiment.

Embodiments of the present invention will now be described. In the following drawings, the same or corresponding parts are denoted by the same reference numerals, and the description thereof will not be repeated.

(First Embodiment)

FIG. 1 is a schematic cross-sectional view showing the structure of a metal member (machine component) that can be produced by the method for producing a metal member according to the present embodiment. Referring to FIG. 1, the metal member 1 has a structure in which a first member 10 made of a first metal and a second member 20 made of a second metal are joined.

The first member 10 has a cylindrical shape. One end face 11 of the first member 10 serves as a joint surface with the second member 20. The second member 20 has a cylindrical (disk) shape. One end face 21 of the second member 20 serves as a joint surface with the first member 10.

The second metal constituting the second member 20 is smaller in deformation resistance than the first metal constituting the first member 10. In the present embodiment, for the first metal, for example, thermally refined steel (tempered and quenched) (for example, JIS SCM440 or other alloy steel for machine structural use or carbon steel for machine structural use) is adopted. For the second metal, copper alloy (for example, high-strength brass) is adopted.

On the one end face 11 of the first member 10, a recess 19 is formed so as to include a region intersecting a central axis C of the first member 10. The recess 19 is filled with the second member 20. This metal member 1 can be produced by the method for producing a metal member in the present embodiment as follows.

Figure 2:
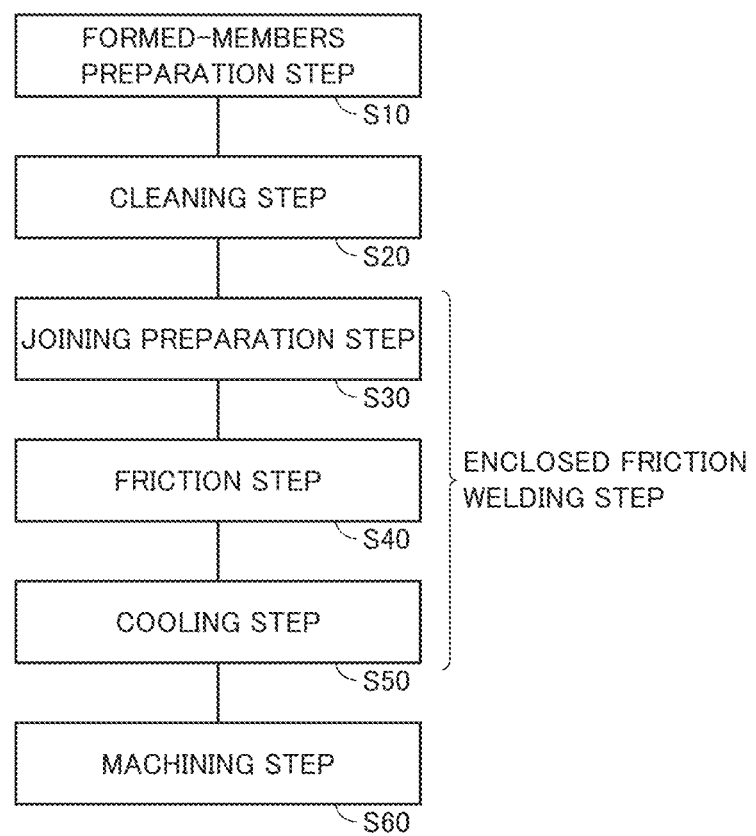
FIG. 2 is a flowchart schematically illustrating a method for producing a metal member.
Figure 3:
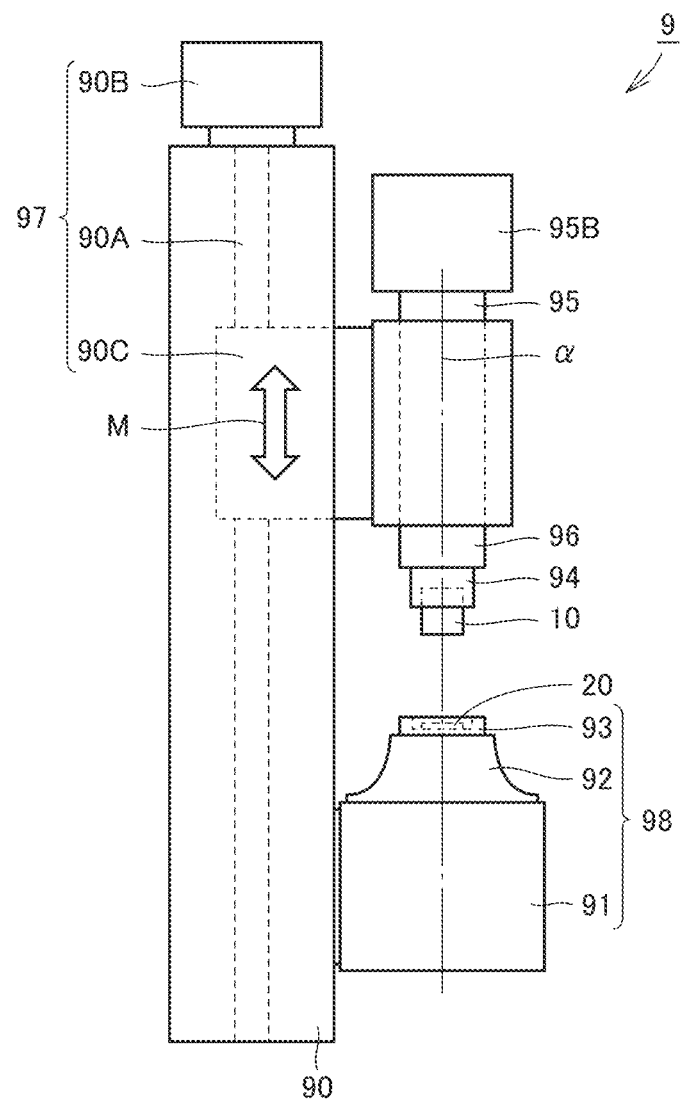
FIG. 3 is a schematic diagram showing the structure of a device for producing a metal member according to the first embodiment.
Figure 4:
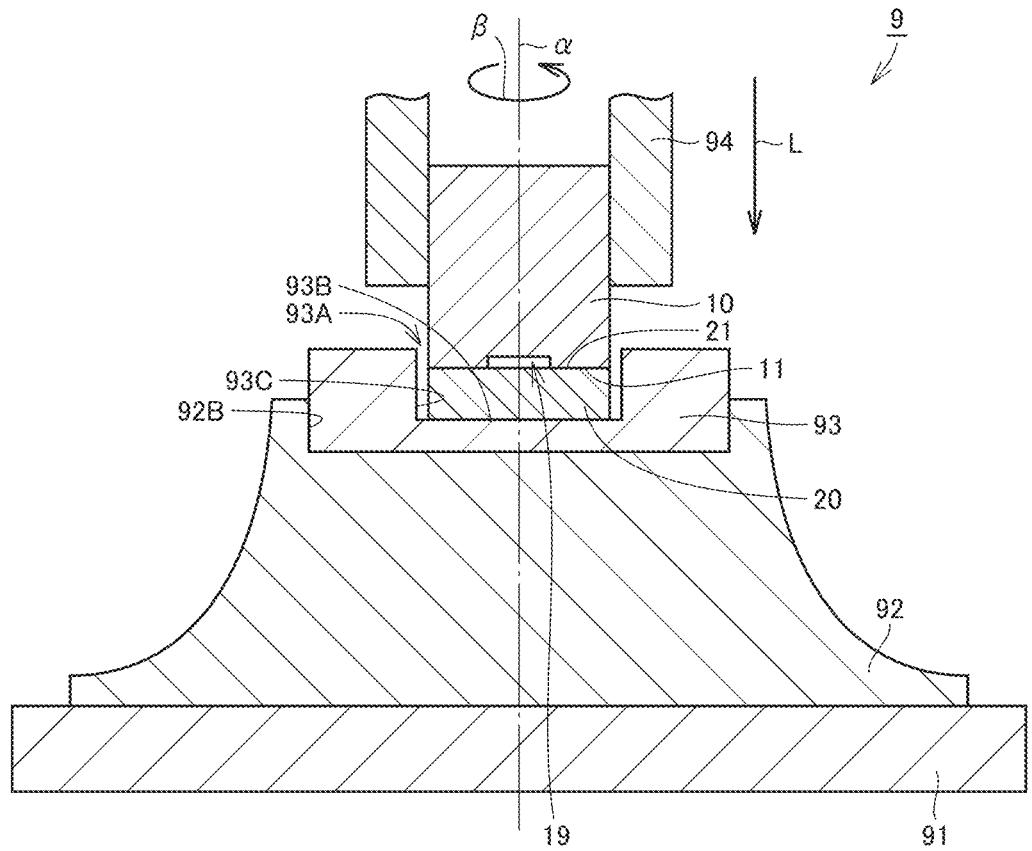
FIG. 4 is a schematic cross-sectional view showing the operation of the metal member producing device according to the first embodiment.
Figure 5:
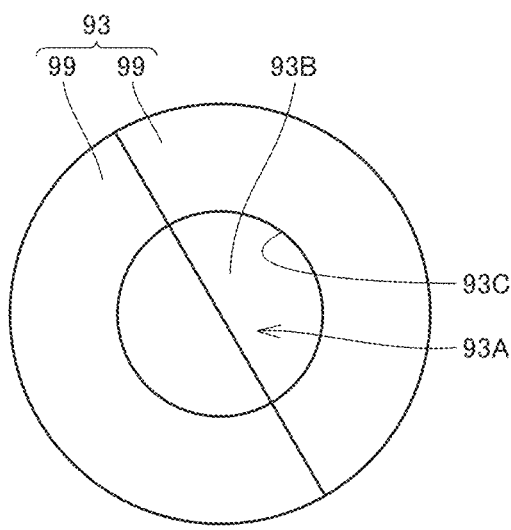
FIG. 5 is a schematic plan view showing the structure of a mold.
Figure 6:
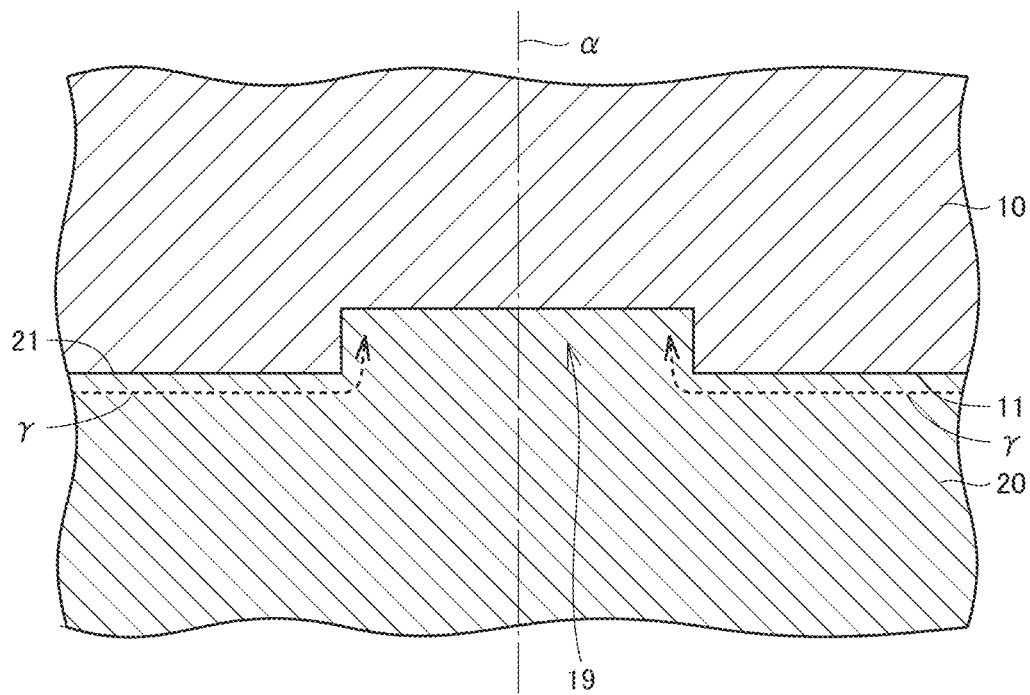
FIG. 6 is a schematic cross-sectional view illustrating the metal member producing method according to the first embodiment.

FIG. 2 is a flowchart schematically illustrating the method for producing a metal member. FIG. 3 is a schematic diagram showing the structure of a device for producing a metal member. FIG. 4 is a schematic cross-sectional view showing the operation of the metal member producing device. FIG. 5 is a schematic plan view showing the structure of a mold included in the metal member producing device. FIG. 6 is a schematic cross-sectional view illustrating the metal member producing method.

Referring to FIG. 2, in the method for producing the metal member 1 in the present embodiment, first, a formed-members preparation step is carried out as a step S10. In this step S10, referring to FIG. 4, a cylindrical first member 10, made of thermally refined alloy steel for machine structural use, and a disk-shaped second member 20, made of high-strength brass, are prepared. One end face 11 of the first member 10 serves as a first contact surface, which is to be a joint surface. The one end face 11 has a recess 19 formed therein. One end face 21 of the second member 20 serves as a second contact surface, which is a flat surface to be a joint surface.

Next, a cleaning step is carried out as a step S20. In this step S20, the first member 10 and the second member 20 prepared in the step S10 are cleaned. The first member 10 and the second member 20 are cleaned using methanol, ethanol, acetone, or other liquid. This removes any foreign matters attached to the first member 10 or the second member 20 during the cutting, machining, or other processes for preparing the first member 10 and the second member 20. In the method for producing the metal member 1 in the present embodiment, precision finish work on end faces of the second member 20 may be omitted; the end faces of the second member 20 may be left as cut.

Next, referring to FIG. 2, an enclosed friction welding step is carried out. This enclosed friction welding step includes a joining preparation step, a friction step, and a cooling step. Here, a device for producing a metal member which produces the metal member 1 by conducting enclosed friction welding will be described.

Referring to FIG. 3, an enclosed friction welding device 9 which is the device for producing a metal member includes: a spindle 95 which is rotatable about an axis α, a base portion 98 disposed spaced apart from the spindle 95 in the axis α direction, a driving portion 97 which adjusts the spacing between the spindle 95 and the base portion 98 by driving the spindle 95 in the axis α directions, and a frame 90 which supports the spindle 95 and the base portion 98.

Referring to FIG. 3, inside the frame 90, a shaft 90A is disposed to extend in parallel with the axis α. This shaft 90A supports a spindle support portion 90C which supports the spindle 95, so as to allow the spindle support portion 90C to move in the directions in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis α directions. This enables adjustment of the spacing between the spindle 95 and the base portion 98. The shaft 90A, the spindle support portion 90C, and the spindle moving motor 90B constitute the driving portion 97.

A rotation-side chuck 94 and a mold 93 are arranged so that, in a state (shown in FIG. 4) where the first member 10 and the second member 20 are made to contact each other with the spacing between the spindle 95 and the base portion 98 adjusted by the driving portion 97, a cavity sidewall 93C defining a cavity 93A surrounds the outer periphery of the one end face 21, which serves as the second contact surface at which the second member 20 comes into contact with the first member 10. Referring to FIG. 4, the cavity sidewall 93C has a height in the axis α direction that is greater than the thickness of the second member 20.

Referring to FIG. 3, the spindle 95 includes the rotation-side chuck 94, which is a first holding portion for holding the first member 10 to oppose the base portion 98. The spindle 95 has connected thereto a spindle motor 95B which rotatively drives the spindle 95 about the axis α. The spindle 95 further has mounted thereon a load sensor 96 which detects a contact load between the first member 10 and the second member 20. The load sensor 96 detects the contact load between the first member 10 and the second member 20 from the magnitude of the contact reaction force between the first member 10 and the second member 20 that is applied to the rotation-side chuck 94. Although the load sensor 96 is not an indispensable component for the enclosed friction welding device 9, the sensor, when provided, facilitates adjusting the contact load between the first member 10 and the second member 20 to an appropriate range.

The base portion 98 has the mold 93 disposed thereon, which is a second holding portion for holding the second member 20 to oppose the rotation-side chuck. Referring to FIGS. 3 and 4, the base portion 98 includes a base body 91, a mold holder 92, and the mold 93. The base body 91 is disposed on the frame 90. The mold holder 92 is fixed on the base body 91. The mold 93 is fitted in a mold holding portion, which is a recessed portion formed in the mold holder 92, and is fixed by a radial chuck surface 92B. The mold 93 can be separated into two parts 99, 99, as shown in FIG. 5.

Referring to FIGS. 4 and 5, the mold 93 includes: a cavity bottom wall 93B which is a circular flat surface, and a cavity sidewall 93C which extends from the cavity bottom wall 93B in a direction intersecting (direction perpendicular to) the cavity bottom wall 93B. The cavity bottom wall 93B and the cavity sidewall 93C define the cavity 93A. The cavity sidewall 93C, which is connected to the outer periphery of the cavity bottom wall 93B of a circular shape, has a cylindrical surface shape having the same diameter as the cavity bottom wall 93B.

A specific procedure of the enclosed friction welding step will now be described. Referring to FIGS. 3 and 4, in the joining preparation step carried out as a step S30, the first member 10 is held at the outer peripheral surface by the rotation-side chuck 94. The second member 20 is set in the cavity 93A of the mold 93. The one end face 21 of the second member 20 is surrounded by the cavity sidewall 93C.

The second member 20 is arranged so that its end face contacts the cavity bottom wall 93B defining the cavity 93A. The first member 10 and the second member 20 are arranged so that the one end face 11 of the first member 10 and the one end face 21 of the second member 20 oppose each other, and that the central axes of the first member 10 and the second member 20 agree with the rotational axis α of the rotation-side chuck. In the one end face 11 serving as the first contact surface, the recess 19 is formed so as to include the region intersecting the rotational axis α. The recess 19 has a disk shape with its central axis aligned with the rotational axis α. In a plan view (as seen from the direction of the rotational axis α), the rotational axis α is located in the recess 19.

A release agent is introduced into the cavity 93A. Thus, in a step S40 described below, the first member 10 and the second member 20 are heated in the presence of the release agent in the cavity 93A. Although introduction of the release agent is not an indispensable procedure, the release agent, when introduced, facilitates removal of a structural body formed with the first member 10 and the second member 20 joined together, from the mold 93 in a step S50 described later. The release agent may be liquid or powder.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the mold 93 while rotating about the axis α.

The first member 10 relatively rotates about the rotational axis α, while being pressed against the second member 20, without changing its positional relationship relative to the second member 20. The temperature increases at the contact portions of the first member 10 and the second member 20 because of the frictional heat. The first member 10 and the second member 20 are heated with the frictional heat. The temperature of the second member 20 increases, for example, to a temperature that is not lower than the softening point and lower than the melting point of the second metal constituting the second member 20.

The second member 20 has a deformation resistance smaller than that of the first member 10, as explained above. The heated second member 20 softens and deforms, thereby coming into contact with the cavity sidewall 93C of the mold 93. This restricts rotation of the second member 20 together with the first member 10, and also restricts further deformation of the second member 20. The friction between the first member 10 and the second member 20 generates further heat, and the generated heat is prevented from being released from within the cavity 93A.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10 and the second member 20 are cooled, while being maintained in the state of being pressed against each other. The first member 10 and the second member 20 are cooled in the state of contacting each other. Accordingly, the first member 10 and the second member 20 are joined directly.

Then, the pressing load is set to zero, and the metal member 1, which is the structural body formed with the first member 10 and the second member 20 joined together, is taken out from the enclosed friction welding device 9. Through the above procedure, the enclosed friction welding step is completed.

Next, a machining step is carried out as a step S60. In this step S60, the metal member 1 obtained in the step S50 is subjected to machining. In the step S60, for example, the flash formed due to deformation of the second member 20 in the step S40 is removed. Thereafter, heat treatment, finish work, and other processes are performed as appropriate, whereby the metal member 1 is completed.

In the step S40 described above, the circumferential velocity of the first member 10 with respect to the second member 20 decreases with decreasing distance from the rotational axis α. The heat produced by friction between the first member 10 and the second member 20 decreases with decreasing distance from the rotational axis α. In the case where the first member 10 has a large diameter, there is a large difference in temperature between the outer peripheral portion and the central portion. Thus, even in the case where the temperature has been increased to a level appropriate for joining in the outer peripheral portion, the increase in temperature may be insufficient in the central portion, hindering achievement of good joining.

In the present embodiment, the recess 19 is formed in the one end face 11 of the first member 10. Referring to FIG. 6, in the present embodiment, the heated and softened second member 20 flows along the arrows γ and enters the recess 19 formed to include the region intersecting the rotational axis α. With the second member 20 entering the recess 19, the heat is supplied to the central portion (region including the rotational axis α). This decreases the difference in temperature between the outer peripheral portion and the central portion. As a result, good joining is readily achieved over the entire joint surfaces.

As described above, according to the method for producing the metal member 1 using the enclosed friction welding device 9 in the present embodiment, it is possible to produce the metal member 1 having a structure in which the first member 10 made of a first metal and the second member 20 made of a second metal having a smaller deformation resistance than the first metal are directly joined firmly to each other. The metal member 1 having a structure in which the members made of different metals are directly joined firmly to each other is produced.

(Second Embodiment)

Figure 7:
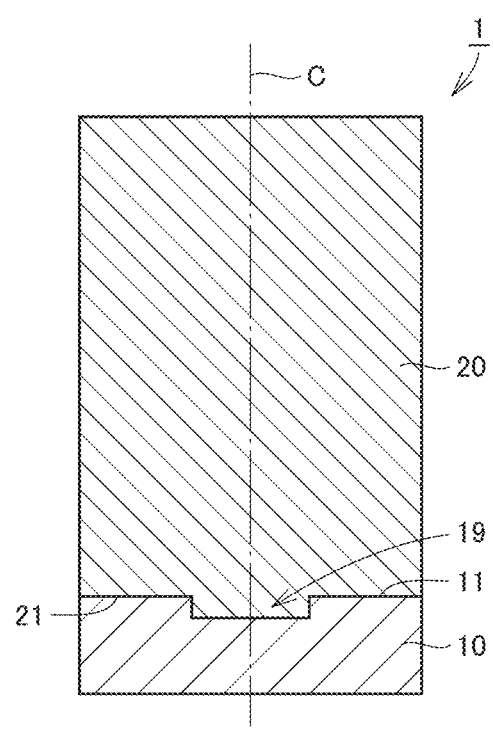
FIG. 7 is a schematic cross-sectional view showing the structure of a metal member according to a second embodiment.

A second embodiment as another embodiment of the present invention will now be described. FIG. 7 is a schematic cross-sectional view showing the structure of a metal member (machine component) that can be produced by the method for producing a metal member according to the second embodiment. Referring to FIG. 7, the metal member 1 has a structure in which a first member 10 made of a first metal and a second member 20 made of a second metal are joined.

The first member 10 has a cylindrical (disk) shape. One end face 11 of the first member 10 serves as a joint surface with the second member 20. The second member 20 has a cylindrical shape. One end face 21 of the second member 20 serves as a joint surface with the first member 10. The second metal constituting the second member 20 is smaller in deformation resistance than the first metal constituting the first member 10. For the first metal and the second metal, similar metals as in the first embodiment are adopted.

On the one end face 11 of the first member 10, a recess 19 is formed so as to include a region intersecting a central axis C of the first member 10. The recess 19 is filled with the second member 20. This metal member 1 can be produced by the method for producing a metal member in the present embodiment as follows.

Figure 8:
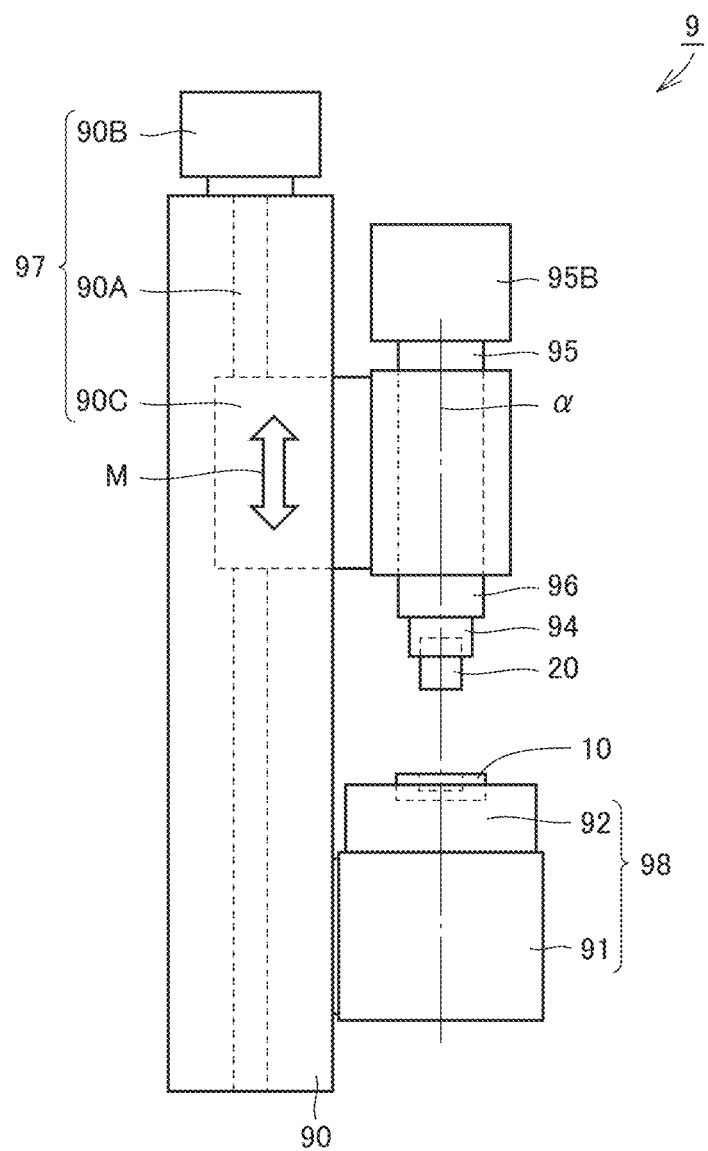
FIG. 8 is a schematic diagram showing the structure of a device for producing a metal member according to the second embodiment.
Figure 9:
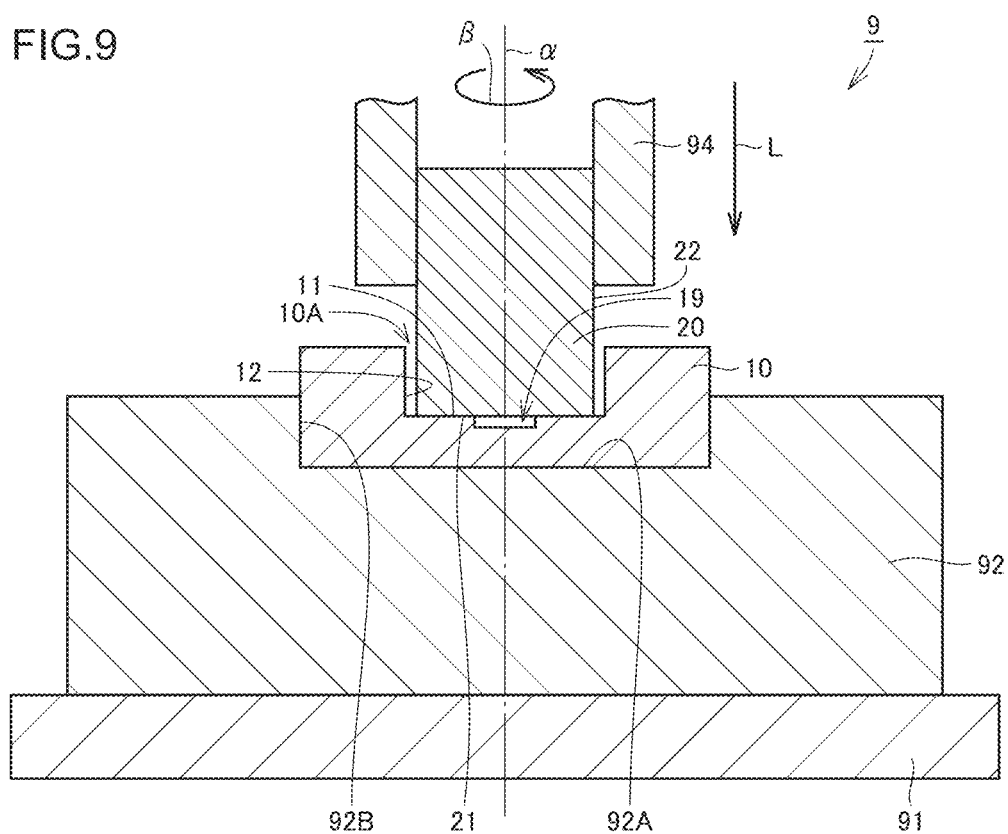
FIG. 9 is a schematic cross-sectional view showing the operation of the metal member producing device according to the second embodiment.
Figure 10:
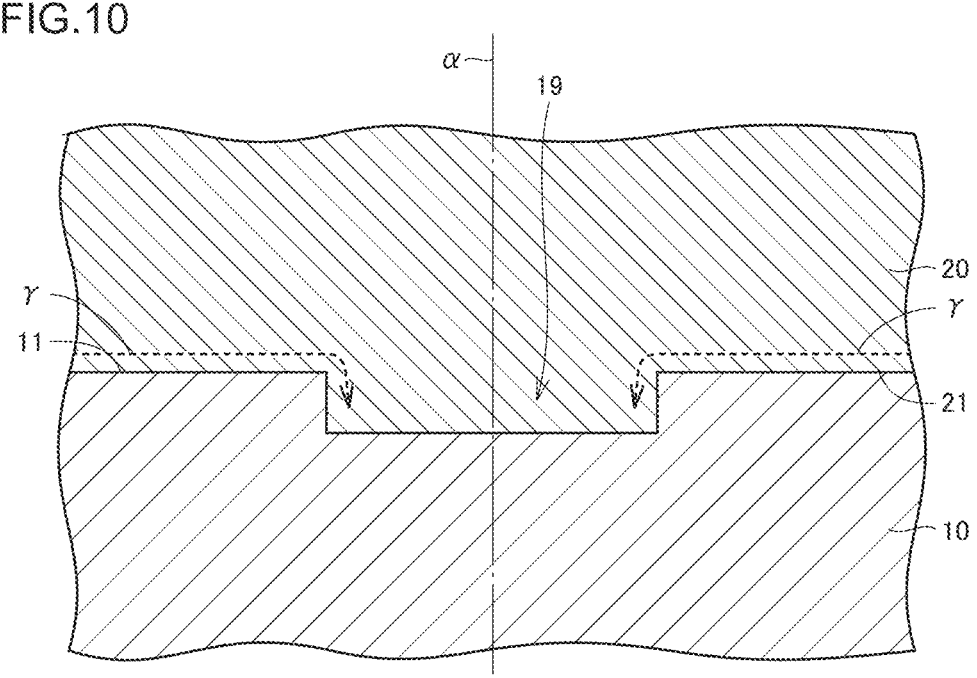
FIG. 10 is a schematic cross-sectional view illustrating the metal member producing method according to the second embodiment.
Figure 11:
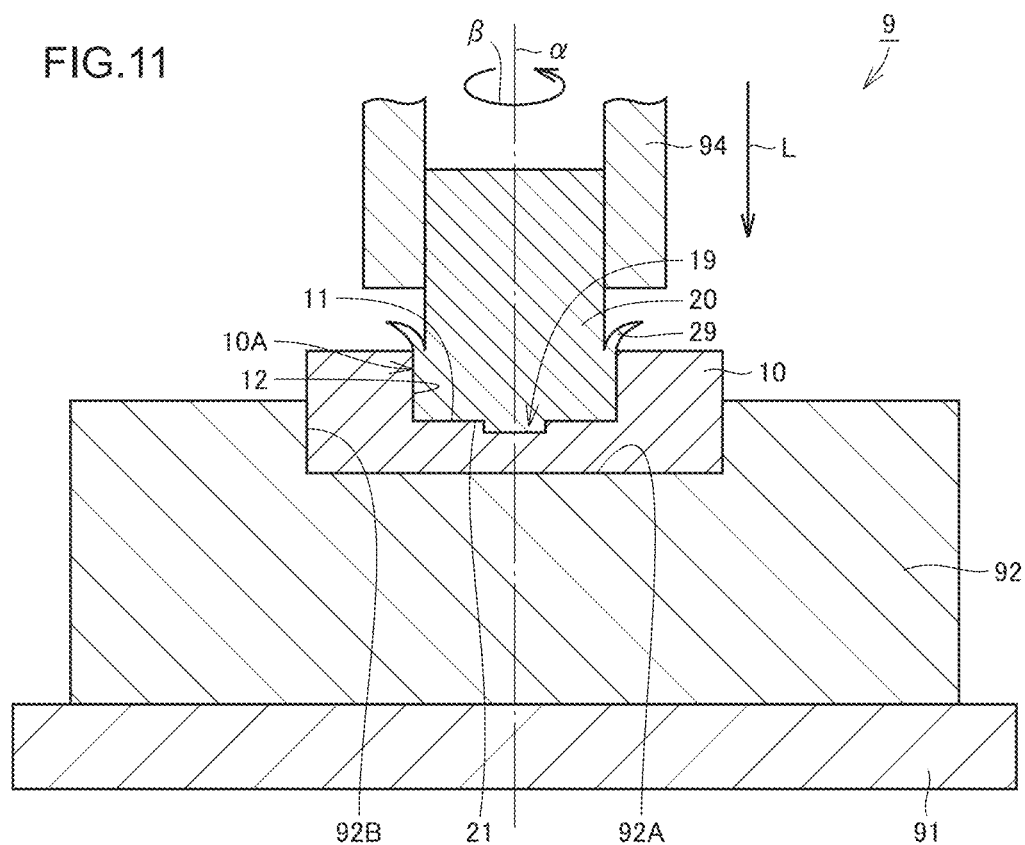
FIG. 11 is another schematic cross-sectional view illustrating the metal member producing method according to the second embodiment.
Figure 12:
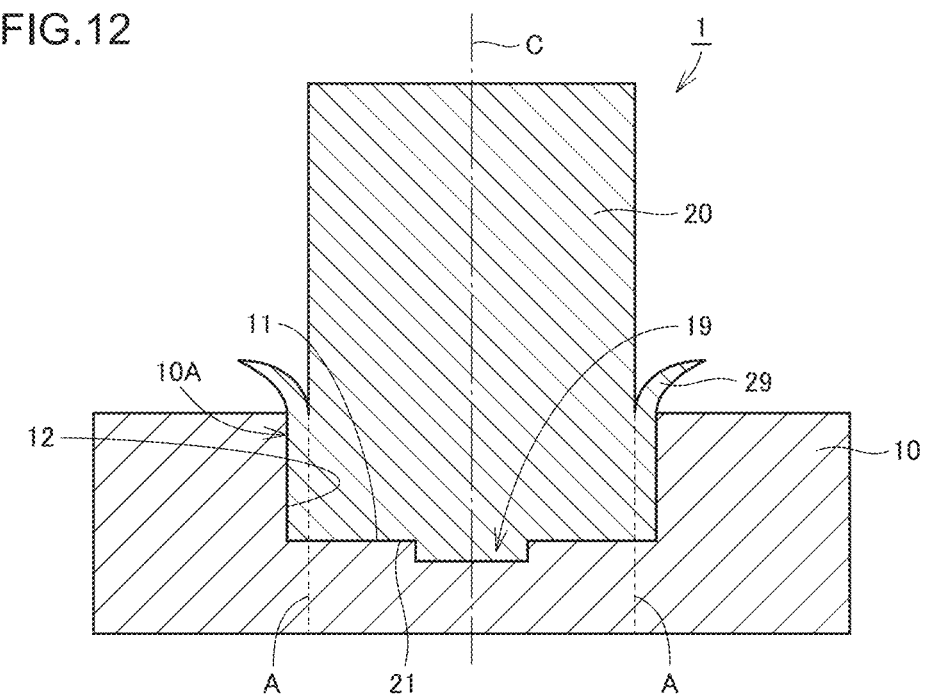
FIG. 12 is another schematic cross-sectional view illustrating the metal member producing method according to the second embodiment.

FIG. 2 is a flowchart schematically illustrating the method for producing a metal member. FIG. 8 is a schematic diagram showing the structure of a device for producing a metal member. FIG. 9 is a schematic cross-sectional view showing the operation of the metal member producing device. FIGS. 10 to 12 are schematic cross-sectional views illustrating the metal member producing method.

Referring to FIG. 2, in the method for producing the metal member 1 in the present embodiment, first, a formed-members preparation step is carried out as a step S10. In this step S10, referring to FIG. 9, a first member 10, made of thermally refined alloy steel for machine structural use, and a second member 20, made of high-strength brass, are prepared. The second member 20 has a cylindrical shape.

The first member 10 has a cylindrical shape (disk shape). The first member 10 has a recessed portion 10A. The recessed portion 10A is formed to include a central axis of the first member 10. The recessed portion 10A has a cylindrical shape. The central axis of the first member 10 and the central axis of the recessed portion 10A are aligned with each other. The first member 10 includes a recessed portion bottom surface 11 defining the recessed portion 10A, and a recessed portion side surface 12 defining the recessed portion 10A and extending in a direction intersecting the recessed portion bottom surface 11.

The recessed portion bottom surface 11 of the first member 10 serves as a first contact surface to be joined to the second member 20. The recessed portion bottom surface 11 has a recess 19 formed therein. The recess 19 is formed in the recessed portion 11. One end face 21 of the second member 20 serves as a second member contact surface, which is a flat surface to be joined to the first member 10.

Next, a cleaning step is carried out as a step S20. This step S20 is performed similarly as in the first embodiment. In the method for producing the metal member 1 in the present embodiment, precision finish work on the one end face 21 of the second member 20 may be omitted; the one end face 21 of the second member 20 may be left as cut.

Next, referring to FIG. 2, an enclosed friction welding step is carried out. This enclosed friction welding step includes a joining preparation step, a friction step, and a cooling step. Here, a device for producing a metal member which produces the metal member 1 by conducting enclosed friction welding will be described.

Referring to FIG. 8, the enclosed friction welding device 9 as the metal member producing device in the second embodiment basically has a similar structure and operates in a similar manner as in the first embodiment. The differences from the first embodiment will now be described.

The spindle 95 includes a rotation-side chuck 94, which holds the second member 20 to oppose the base portion 98. The base portion 98 includes a fixed-side chuck 92, which holds the first member 10 to oppose the rotation-side chuck 94. Referring to FIGS. 8 and 9, the base portion 98 includes a base body 91 and the fixed-side chuck 92. The fixed-side chuck 92 is fixed on the base body 91. The fixed-side chuck 92 includes a bottom surface 92A, which holds the first member 10 in the axial direction, and a radial chuck surface 92B, which holds the first member 10 in the radial direction.

A specific procedure of the enclosed friction welding step will now be described. Referring to FIG. 8, in the joining preparation step carried out as a step S30, the second member 20 is held at the outer peripheral surface by the rotation-side chuck 94. The first member 10 is held at the outer peripheral surface by the fixed-side chuck 92.

The first member 10 and the second member 20 are arranged so that the recessed portion bottom surface 11 of the first member 10 and the one end face 21 of the second member 20 oppose each other, and that the central axes of the first member 10 and the second member 20 agree with the rotational axis α of the rotation-side chuck 94. In the recessed portion bottom surface 11 as the first contact surface, a recess 19 is formed so as to include the region intersecting the rotational axis α. The recess 19 has a disk shape having its central axis aligned with the rotational axis α.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the fixed-side chuck 92 while rotating about the axis α.

Then, as shown in FIG. 9, in a state where at least a part (a region including the one end face 21) of the second member 20 is received in the recessed portion 10A, the second member 20 relatively rotates, while being pressed against the first member 10 with a prescribed load, without changing its position relative to the first member 10. The second member 20 rotates while being relatively pressed against the recessed portion bottom surface 11 of the first member 10. This increases the temperatures of the first member 10 and the second member 20 because of the frictional heat.

At the beginning of rotation, there is a gap between an outer peripheral surface 22 of the second member 20 and the recessed portion side surface 12 of the first member 10. At the start of rotation, the outer peripheral surface 22 of the second member 20 is not in contact with the recessed portion side surface 12 of the first member 10.

The circumferential velocity of the second member 20 with respect to the first member 10 decreases with decreasing distance from the rotational axis α. The heat produced by friction between the first member 10 and the second member 20 decreases with decreasing distance from the rotational axis α. In the case where the second member 20 has a large diameter, there is a large difference in temperature between the outer peripheral portion and the central portion. Thus, even in the case where the temperature has been increased to a level appropriate for joining in the outer peripheral portion, the increase in temperature may be insufficient in the central portion.

In the present embodiment, the recess 19 is formed in the recessed portion bottom surface 11 of the first member 10. Further, the deformation resistance of the second member 20 is smaller than that of the first member 10. Referring to FIG. 10, in the present embodiment, the heated and softened second member 20 flows along the arrows γ and enters the recess 19, which has been formed to include the region intersecting the rotational axis α.

Referring to FIG. 11, the heated second member 20 softens and deforms, thereby contacting the recessed portion side surface 12. The deformation of the second member 20 is limited by the wall surfaces (recessed portion bottom surface 11 and recessed portion side surface 12) defining the recessed portion 10A of the first member 10. This prevents the heat generated by the friction from being released from within the recessed portion 10A. The recessed portion 10A is filled with the softened second member 20. A flash 29 is formed due to deformation of the second member 20.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10 and the second member 20 are cooled, while being maintained in the state of being pressed against each other. The first member 10 and the second member 20 are cooled in the state of contacting each other. Accordingly, the first member 10 and the second member 20 are joined.

Then, the pressing load is set to zero, and the metal member 1, which is the structural body formed with the first member 10 and the second member 20 joined together, is taken out from the enclosed friction welding device 9 (see FIG. 12). Through the above procedure, the enclosed friction welding step is completed.

Next, a machining step is carried out as a step S60. In this step S60, the metal member 1 obtained in the step S50 is subjected to cutting and other machining. Referring to FIG. 12, in the step S60, in the state where the first member 10 and the second member 20 are joined together, the flash 29 formed due to deformation of the second member 20 in the step S40 is removed.

Referring to FIG. 12, in the step S60, further in the state where the first member 10 and the second member 20 are joined together, the first member 10 is machined so that the recessed portion side surface 12 is removed. The first member 10 and the second member 20 are cut along the broken lines A, so that the outer peripheral region including the recessed portion side surface 12 as well as the flash 29 is removed. Through the above procedure, the metal member 1, which is the joint body of the first member 10 and the second member 20 shown in FIG. 7, is obtained. The removal of the outer peripheral region including the recessed portion side surface 12 and the removal of the flash 29 may be performed continuously as a single step, or may be performed as separate steps at different times. Thereafter, heat treatment, finish work, and other processes are performed as appropriate, whereby the metal member 1 is completed.

In the present embodiment, the second member 20 softened in the step S40 enters the recess 19, so the heat is supplied to the central portion (region including the rotational axis α). This decreases the difference in temperature between the outer peripheral portion and the central portion. As a result, good joining is readily achieved over the entire joint surfaces.

As described above, according to the method for producing the metal member 1 using the enclosed friction welding device 9 in the present embodiment, it is possible to produce the metal member 1 having a structure in which the first member 10 made of the first metal and the second member 20 made of the second metal having a smaller deformation resistance than the first metal are directly joined firmly to each other. The metal member 1 having a structure in which the first member 10 and the second member 20 made of different metals are directly joined firmly to each other can be produced.

In the step S40 in the first and second embodiments described above, the deformation resistance of the second member 20 (second metal) in the temperature increased state is preferably smaller by 10% or more, more preferably smaller by 50% or more, and further preferably smaller by 80% or more, as compared to the deformation resistance of the first member 10 (first metal) in the temperature increased state. As explained above, the first member 10 and the second member 20 can be joined as in the present embodiment in the case where the second member 20 (second metal) is smaller in deformation resistance than the first member 10 (first metal). If the difference in deformation resistance between the first member 10 and the second member 20 is small, however, not only the second member 20, but also the first member 10 may be deformed in the step S40.

In such a case, it would be difficult to join the first member 10 and the second member 20 satisfactorily, thereby creating a need to strictly manage the temperatures of the first member 10 and the second member 20 in the step S40. Setting the deformation resistance of the second metal in the temperature increased state smaller than that of the first metal by 10% or more in the step S40 facilitates achievement of good joining, and setting the same smaller by 50% or more, or even 80% or more, can further facilitate the achievement of good joining.

EXAMPLES

An experiment was conducted in which a first member 10 and a second member 20 were joined through a similar procedure as in the first embodiment described above to produce a sample of the metal member 1. For the metal (first metal) constituting the first member 10, JIS SCM440 (tempered and quenched), being steel (alloy steel for machine structural use), was adopted. For the metal (second metal) constituting the second member 20, high-strength brass was adopted. The first member 10 was made to have a diameter of 127 mm. The second member 20 was made to have a diameter of 130 mm and a thickness of 3 mm. On the one end face 11 of the first member 10, a disk-shaped recess 19 was formed to have a diameter of 48 mm and a depth of 0.1 mm, with its central axis aligned with that of the first member 10 (Example). For comparison, a sample was also produced under the same conditions, except that no recess 19 was formed (Comparative Example).

Figure 13:
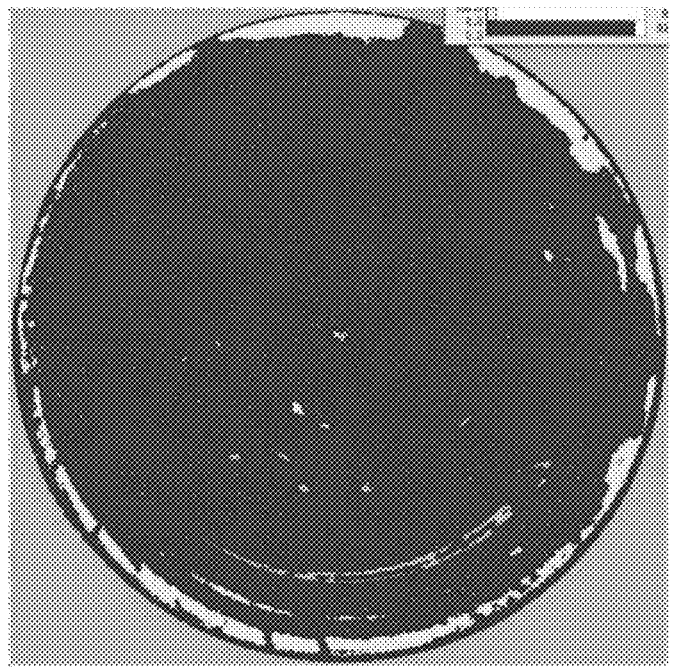
FIG. 13 shows the joined state confirmed by ultrasonic testing (Example)

The produced samples were subjected to ultrasonic testing, for confirmation of the joined state of the first member 10 and the second member 20. The test result of the sample of the Example is shown in FIG. 13. The test result of the sample of the Comparative Example is shown in FIG. 14.

Figure 14:
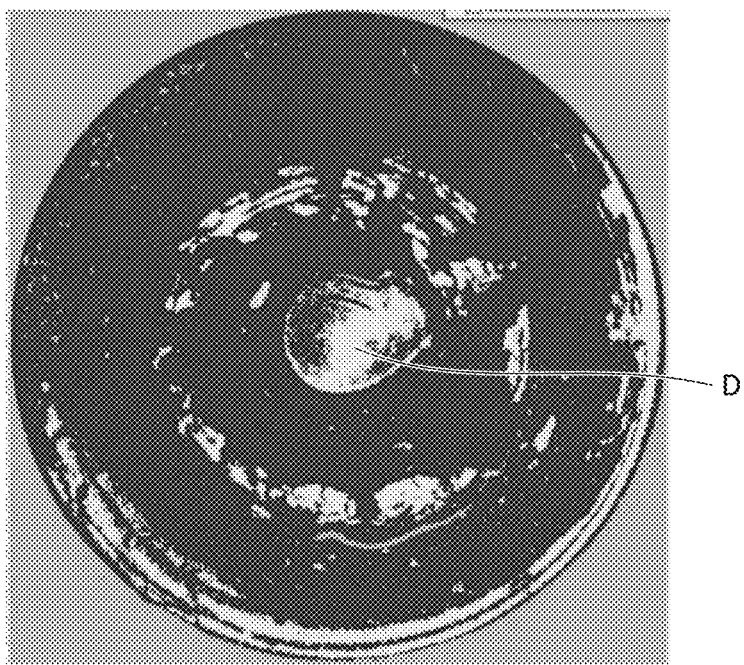
FIG. 14 shows the joined state confirmed by ultrasonic testing (Comparative Example)

FIGS. 13 and 14 are images each corresponding to the cross section parallel to the joint surfaces of the first member 10 and the second member 20. In FIGS. 13 and 14, the white regions are regions where defects have been detected. Referring to FIG. 14, in the sample of the Comparative Example, an unjoined region D is formed in the vicinity of the center of the joint surfaces.

As explained above, the circumferential velocity of the first member 10 with respect to the second member 20 decreases with decreasing distance from the rotational axis α. The heat produced by the friction between the first member 10 and the second member 20 decreases with decreasing distance from the rotational axis α.

In the case where the first member 10 has a large diameter as in the present sample (with the diameter of 127 mm), there is a large temperature difference between the outer peripheral portion and the central portion. Thus, even in the case where the temperature has been increased to a level appropriate for joining in the outer peripheral portion, the increase in temperature may be insufficient in the central portion. This is probably the reason why achievement of good joining failed.

Referring to FIG. 13, in the sample of the Example, no unjoined region is confirmed in the vicinity of the center of the joint surfaces. This is presumably because of the recess 19 formed in the one end face 11 of the first member 10 in the sample of the Example.

In the sample of the Example, the heated and softened second member 20 flows into the recess 19. With the second member 20 entering the recess 19, heat is supplied to the central portion (region including the rotational axis α). This decreases the temperature difference between the outer peripheral portion and the central portion. This is probably the reason why good joining was achieved over the entire joint surfaces.

Figure 15:
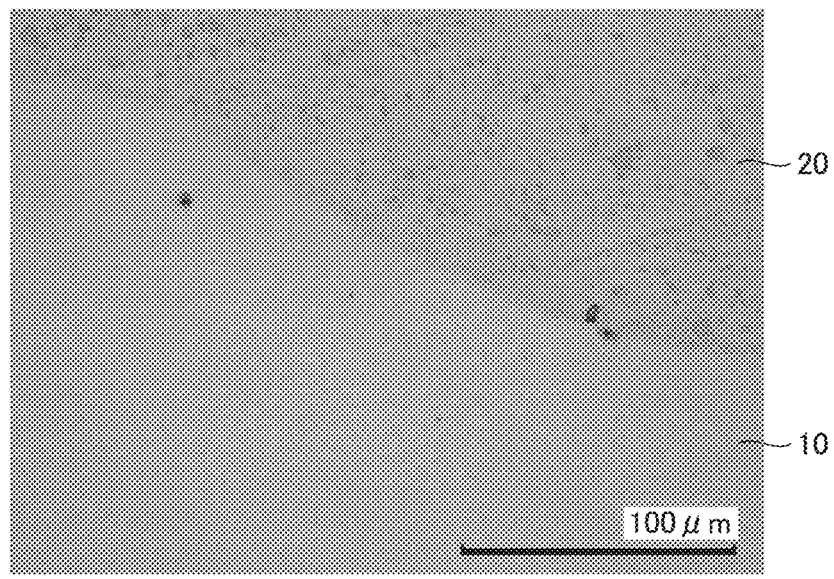
FIG. 15 is an optical micrograph showing the state at and around the interface between the first member and the second member in the vicinity of an edge of a recess.
Figure 16:
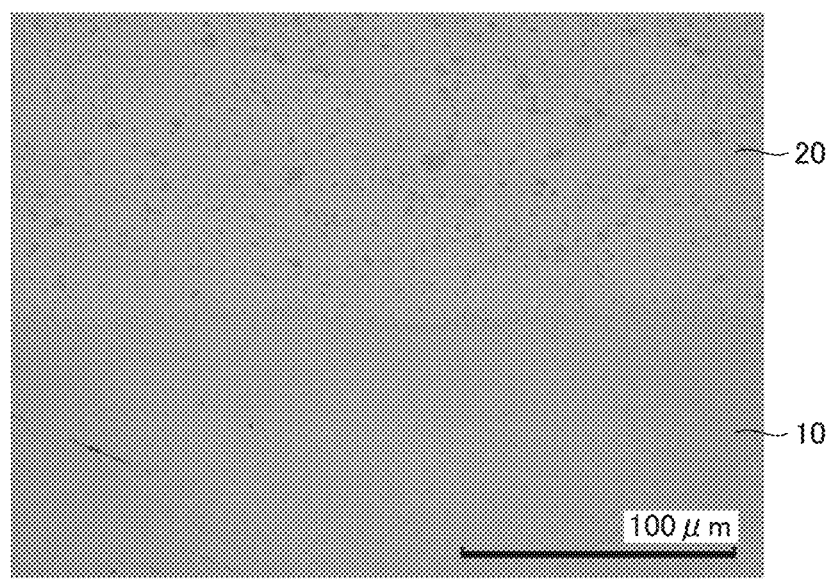
FIG. 16 is an optical micrograph showing the state at and around the interface between the first member and the second member in the vicinity of the center of the recess.

The sample of the Example above was cut in a plane perpendicular to the joint surfaces, and the region at and around the interface between the first member 10 and the second member 20 was observed using an optical microscope. FIG. 15 is a photograph showing the state at and around the interface between the first member 10 and the second member 20 in the vicinity of an edge in the radial direction of the recess 19. FIG. 16 is a photograph showing the state at and around the interface between the first member 10 and the second member 20 in the vicinity of the center in the radial direction of the recess 19.

Referring to FIGS. 15 and 16, it is confirmed that the first member 10 and the second member 20 have been joined satisfactorily in both of the region around the center and the region around the edge of the recess 19.

The above experimental results show that the metal member producing method according to the present invention is able to produce the metal member having a structure in which the members made of different metals are directly joined to each other. Particularly in the case of producing a metal member with a large diameter, it is effective to apply the present invention where the recess is formed in the first member. For example in the Example described above, the time required for joining the first member and the second member is about ten seconds, enabling joining in a short time.

While the case of adopting steel as the metal (first metal) constituting the first member and brass as the metal (second metal) constituting the second member has been given by way of example in the embodiments and examples described above, the metals adoptable in the present invention are not limited thereto. Examples of combination of adoptable metals are shown in Table 1 below.

TABLE 1

| First Member | Second Member |
| --- | --- |
| steel | brass |
| steel | aluminum alloy |
| steel | nickel-based alloy |
| cemented carbide | steel |

As shown in Table 1, in the metal member producing method of the present invention, various combinations of the first member made of a first metal and the second member made of a second metal having a smaller deformation resistance than the first metal can be adopted.

It should be understood that the embodiments and examples disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The metal member producing method according to the present invention may be applicable particularly advantageously to the production of a metal member having a structure in which members made of different metals are directly joined to each other.

DESCRIPTION OF REFERENCE NUMERALS

1: metal member; 9: enclosed friction welding device; 10: first member; 10A: recessed portion; 11: end face (recessed portion bottom surface); 12: recessed portion side surface; 19: recess; 20: second member; 21: end face; 22: outer peripheral surface; 29: flash; 90: frame; 90A: shaft; 90B: spindle moving motor; 90C: spindle support portion; 91: base body; 92: mold holder (fixed-side chuck); 92A: bottom surface; 92B: radial chuck surface; 93: mold; 93A: cavity; 93B: cavity bottom wall; 93C: cavity sidewall; 94: rotation-side chuck; 95: spindle; 95B: spindle motor; 96: load sensor; 97: driving portion; 98: base portion; and 99: part.

The invention claimed is:

1. A method for producing a metal member, comprising the steps of:
preparing a first member made of a first metal and a second member made of a second metal having a smaller deformation resistance than the first metal;
joining the first member and the second member,
the step of joining the first member and the second member including steps of
heating the first member and the second member by relatively rotating the first member and the second member with respect to each other about an axis of rotation, while pressing the first member and the second member against each other, without changing a relative positional relationship between the first member and the second member, the first member having a surface serving as a first contact surface coming into contact with the second member, the first contact surface having a recess formed therein so as to include a region intersecting the axis of rotation, and
cooling the first member and the second member heated, with the members being pressed against each other; and
in a state where the first member and the second member are joined together, removing a flash formed due to deformation of the second member in the step of heating the first member and the second member.

2. The method for producing a metal member according to claim 1, wherein in the step of heating the first member and the second member, the second member is disposed in a cavity of a mold.

3. The method for producing a metal member according to claim 2, wherein the mold includes
a cavity bottom wall defining the cavity, and
a cavity sidewall defining the cavity and extending in a direction intersecting the cavity bottom wall.

4. The method for producing a metal member according to claim 3, wherein in the step of heating the first member and the second member, a second contact surface, being a surface of the second member coming into contact with the first member, is surrounded by the cavity sidewall.

5. The method for producing a metal member according to claim 2, wherein in the step of heating the first member and the second member, the first member is rotated while the mold is fixed.

6. The method for producing a metal member according to claim 1, wherein
the first member has a recessed portion formed therein, the recess is formed in the recessed portion, and
in the step of heating the first member and the second member, the second member in a state of being at least partially received in the recessed portion is relatively rotated with respect to the first member while being relatively pressed against the first member, to heat the first member and the second member.

7. The method for producing a metal member according to claim 6, wherein
the first member includes
a recessed portion bottom surface defining the recessed portion, and
a recessed portion side surface defining the recessed portion and extending in a direction intersecting the recessed portion bottom surface, and
in the step of heating the first member and the second member, the second member is relatively rotated while being relatively pressed against the recessed portion bottom surface of the first member.

8. The method for producing a metal member according to claim 7, wherein in the step of heating the first member and the second member, the second member is deformed to contact the recessed portion side surface.

9. The method for producing a metal member according to claim 7, further comprising the step of, in a state where the first member and the second member are joined together, machining the first member to remove the recessed portion side surface.

10. The method for producing a metal member according to claim 6, wherein in the step of heating the first member and the second member, the second member is rotated while the first member is fixed.

11. The method for producing a metal member according to claim 1, wherein in the step of heating the first member and the second member, the second metal in a temperature increased state has a deformation resistance smaller by 10% or more as compared to a deformation resistance of the first metal in a temperature increased state.

* * * * *